March 30, 1971 — W. W. REILLY — 3,573,156
GLASS FRONT BUILDING PANEL COMPRISING OUTER GLASS
LAYERS AND INNER FELT LAYER
Filed Dec. 3, 1968

INVENTOR.
WILLIAM W. REILLY
BY
ATTORNEY

United States Patent Office 3,573,156
Patented Mar. 30, 1971

3,573,156
GLASS FRONT BUILDING PANEL COMPRISING OUTER GLASS LAYERS AND INNER FELT LAYER
William W. Reilly, 4506 Euclid, Youngstown, Ohio 44506
Filed Dec. 3, 1968, Ser. No. 780,793
Int. Cl. B32b 17/06
U.S. Cl. 161—197      4 Claims

ABSTRACT OF THE DISCLOSURE

A building panel particularly suited for exterior wall surfaces and comprising a laminated structure having a glass front, a layer of colored enamel on the inner surface thereof, a layer of builders felt and a back panel of glass or other suitable material. The several portions of the panel being permanently bonded to one another by a suitable adhesive so as to form a weatherproof shock resistant non-shattering decorative wall panel.

BACKGROUND OF THE INVENTION

(1) Field of the invention

This invention relates to wall panels formed in various sizes and generally used in forming exterior surfaces on building constructions.

(2) Description of the prior art

Prior building panels or curtain wall panels of this type have generally employed single thickness sections of material such as aluminum, stainless steel, glass and the like and some of the prior structures show attempts to provide insulated constructions such as, for example, that shown in Pat. No. 3,160,925 wherein front and back surface panels are spaced by an insulating layer of polystyrene foam and Pat. No. 2,095,269 which shows a glass fronted panel with a metal foil backing.

The present invention provides an inexpensive, extremely durable panel which may be colored easily and inexpensively at the time of manufacture and which provides front and back surfaces which may be the finished wall surfaces as, for example, in a curtain wall.

SUMMARY OF THE INVENTION

A glass front building panel comprising a pair of glass sections secured in a laminated assembly and incorporating a layer of color enamel on the inner surface of one of the glass panels and an intermediate layer of builders felt or the like between the glass panels, the whole assembly being secured in an integral shock resistant panel by adhesives bonding the same together. The glass front building panel is formed in its preferred embodiment by utilizing two sheets of single strength window glass, one of which has a layer of oil enamel of a desirable color coated on the inner side thereof and when the enamel is dried a layer of adhesive such as a casein glue is applied to secure a layer of builders felt or the like thereto. A second layer of adhesive on the opposite side of the builders felt secures the second glass panel to the assembly and those skilled in the art will observe that the resulting integral bonded curtain wall panel is weatherproof, shockproof, provides a desirable insulated structure and may be simply and inexpensively formed of readily available materials.

DESCRIPTION OF THE PREFERRED EMBODIMENT

Figure 1:
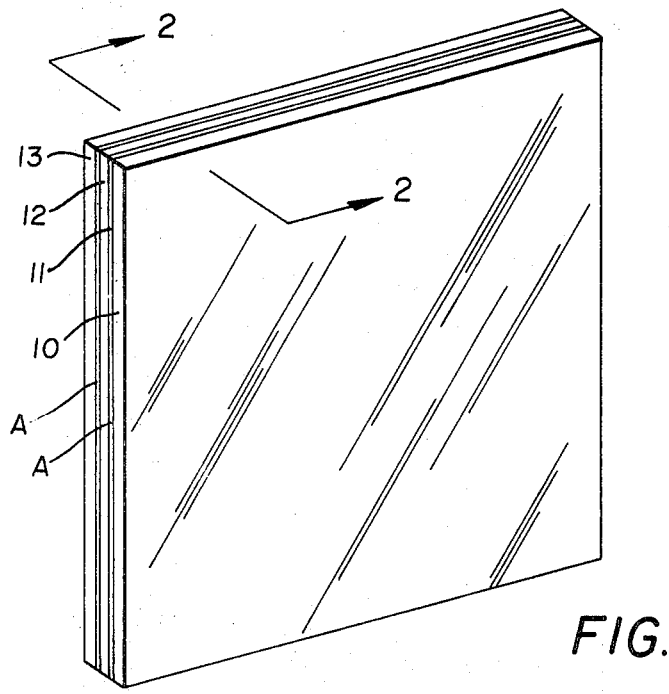
FIG. 1 is a perspective view of a glass front building wall panel.
Figure 2:
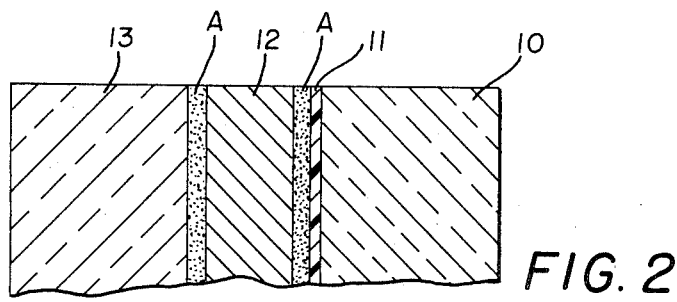
FIG. 2 is an enlarged cross section on line 2—2 of FIG. 1.

In its simplest form the glass front building panel consists of a section of single strength window glass 10 having a film like coating of desirably colored oil enamel 11 on one side thereof, the inner side, as seen in FIGS. 1 and 2 of the drawings, a section of fibrous matted material treated to be water tight, knows as builders felt 12 or the like secured to the enameled surface of the section of glass 10 and a second section of glass 13 secured by an adhesive to the opposite or back side of the builders felt 12.

In FIGS. 1 and 2 of the drawings, the layers of adhesive are somewhat exaggerated and indicated by the letters A.

In forming the glass front building panel disclosed herein, the first section of glass 10 is preferably coated on one side with a film like layer of desirable colored oil enamel as seen at 11 in the drawings. The enamel is allowed to dry completely whereupon a first coating of adhesive A is applied, a layer of builders felt 12 is added, a second layer of adhesive A is applied to the builders felt and the back glass panel 13 is added to the assembly, which is then held under pressure in stationary position until the adhesive has set. The colored enamel provides the desired exterior color for the completed panel and it may obviously be of whatever color is desired. Alternately, the inner surface of the first glass panel 10 may be etched with a suitable acid as understood by those skilled in the art and before the laminated assembly is made.

In the preferred embodiment, however, the layer of oil enamel is important for the reason that the otherwise clear colorless glass is given a desired color through the use thereof.

The adhesive employed may be any one of a number of contact cements or the like known in the art and/or casein glue. Many adhesives and glues may be used which will not adversely effect the layer of enamel and which will bond the several portions of the glass front building panel in an integral unit.

Those skilled in the art will observe that, if desired, the second or back glass section 13 may be eliminated from the construction and a wood aluminum flakeboard or hardboard panel substituted therefor.

Figure 3:
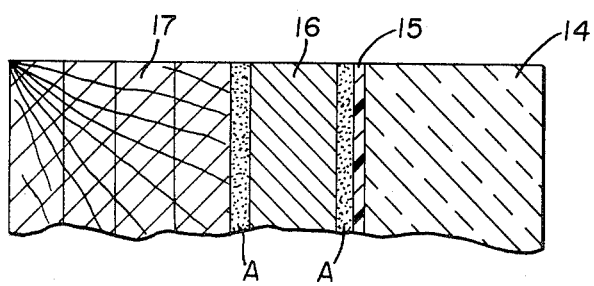
FIG. 3 is an enlarged cross section of an alternate construction wherein one of the glass sections is replaced by a piece of plywood.

By referring to FIG. 3 of the drawings, such modification may be seen in which the front glass panel is indicated by the numeral 14, the color layer by the numeral 15, the felt layer by the numeral 16 and the back or supporting layer comprises a section of plywood 17. The several portions are assembled through the use of layers of adhesive A exactly the same as in the preferred embodiment of the invention hereinbefore described.

Those skilled in the art will observe that the use of the builders felt 16 or like fibrous matted material adds desirable qualities to the glass front building panel, primarily the builders felt section adds durability and shock resistance. Tests of panels formed in accordance with the invention show that it is extremely difficult to break or crack the front glass panel and if it is cracked the portions will not shatter as they adhere to the assembly. The builders felt layer 12 in addition to providing a desirable structural cushioning and bonding action adds a desirable degree of insulation.

The glass front building panel disclosed herein may be use in connection with metal or plastic frames or dividers as common in curtain wall and resurfacing building wall panel construction and when the panels are small and used as tiles on inner walls, as in bathrooms and kitchens the space between the several panels may be filled with a suitable plastic grout such as the resilient silicone cement available commercially.

Although but two embodiments of the present invention have been illustrated and described, it will be apparent to those skilled in the art that various changes and modifications may be made therein without departing from the spirit of the invention.

Having thus described my invention, what I claim is:

1. A glass front building panel comprising an integral bonded structure incorporating a first glass section having a coating of oil enamel of a desirable color on one side thereof, a section of builders felt positioned adjacent the colored enamel and secured thereto by a suitable adhesive and a second glass section positioned on the opposite side of the layer of builders felt and secured thereto by a suitable adhesive.

2. The glass front building panel set forth in claim 1 and wherein the layers of adhesive comprise casein glue.

3. The glass front building panel set forth in claim 1 and wherein the inner surface of the first glass section is etched.

4. The glass front building panel set forth in claim 1 and wherein the layer of builders felt has a fibrous cushioned characteristic.

References Cited

UNITED STATES PATENTS

| | | | |
|---|---|---|---|
| 121,696 | 12/1871 | Webb | 161—202X |
| 417,232 | 12/1889 | Crull | 52—307 |
| 624,923 | 5/1899 | Gordon | 161—202X |
| 1,804,508 | 5/1931 | Nicholson | 161—197X |
| 2,095,269 | 12/1937 | Schuler | 161—202X |
| 2,114,473 | 4/1938 | Labra | 161—197 |
| 3,160,925 | 12/1964 | Gort | 161—192X |

FOREIGN PATENTS

| | | | |
|---|---|---|---|
| 1,014,171 | 5/1952 | France | 161—192 |

JOHN T. GOOLKASIAN, Primary Examiner

D. J. FRITSCH, Assistant Examiner

U.S. Cl. X.R.

52—37, 311; 161—6, 151, 192, 230